March 30, 1948.  W. J. O'BRIEN  2,438,573
EQUI-SIGNAL RADIO BEACON SYSTEM
Original Filed March 2, 1942   3 Sheets-Sheet 1
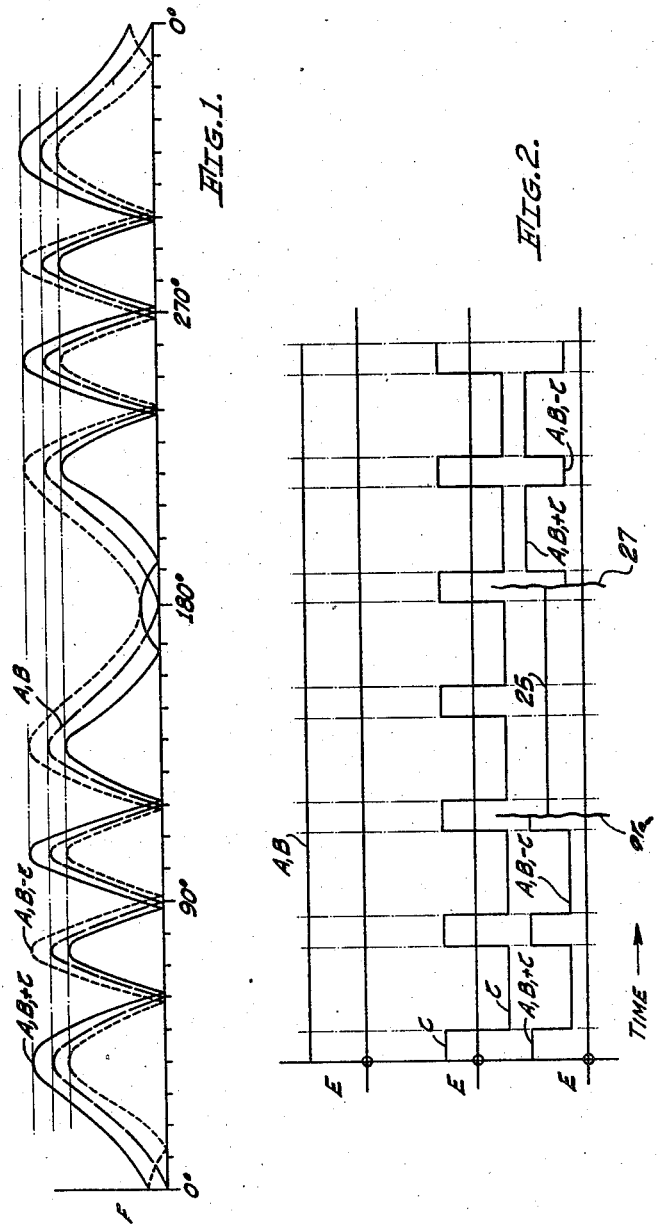
INVENTOR
WILLIAM J. O'BRIEN,
BY
Harold W. Mattingly
ATTORNEY.

March 30, 1948. W. J. O'BRIEN 2,438,573
EQUI-SIGNAL RADIO BEACON SYSTEM
Original Filed March 2, 1942 3 Sheets-Sheet 2
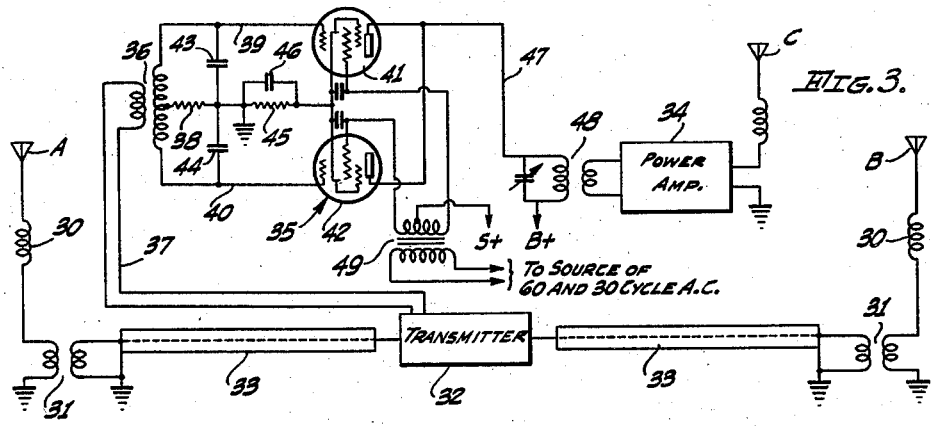
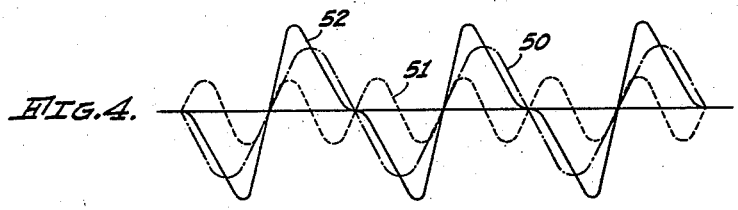
Fig.4.
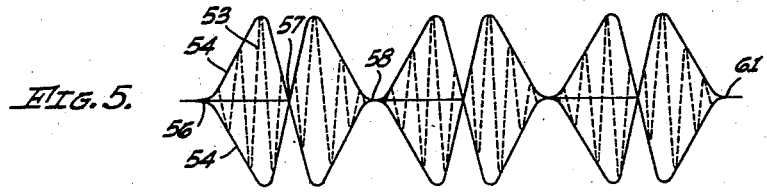
Fig.5.
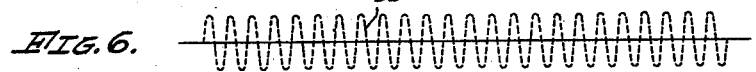
Fig.6.
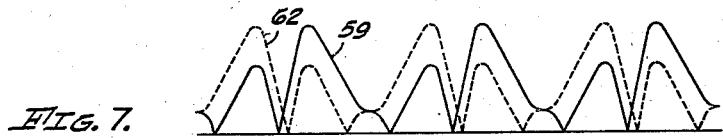
Fig.7.
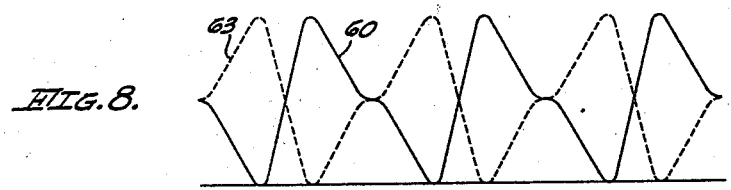
Fig.8.
INVENTOR
WILLIAM J. O'BRIEN,
BY
ATTORNEY.

March 30, 1948.  W. J. O'BRIEN  2,438,573
EQUI-SIGNAL RADIO BEACON SYSTEM
Original Filed March 2, 1942  3 Sheets-Sheet 3
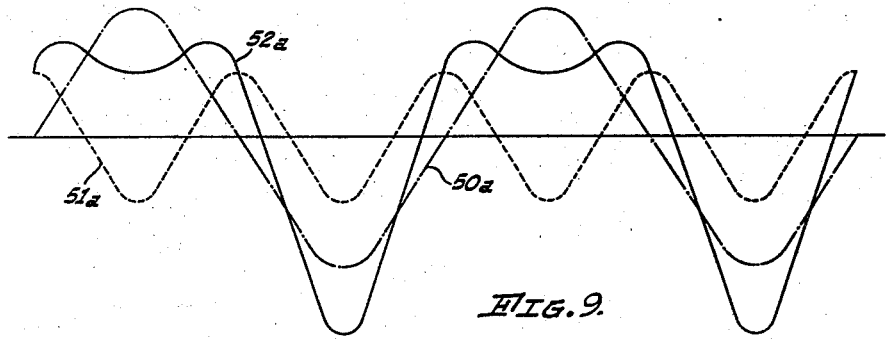
FIG. 9.
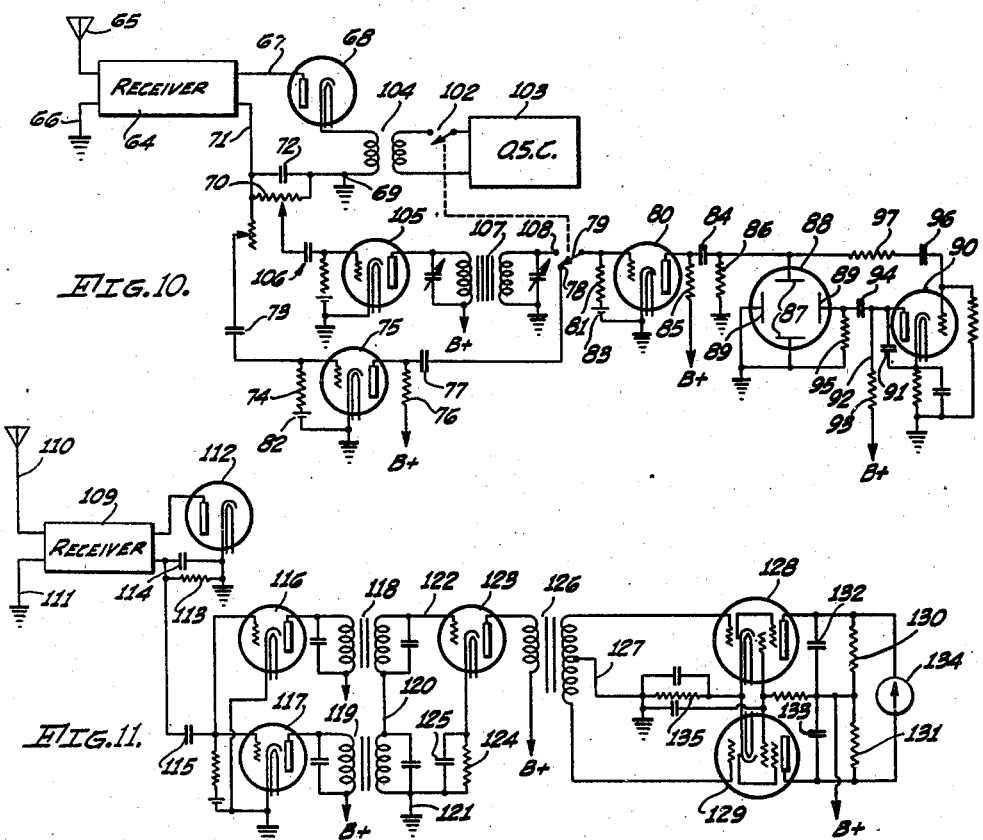
FIG. 10.
FIG. 11.
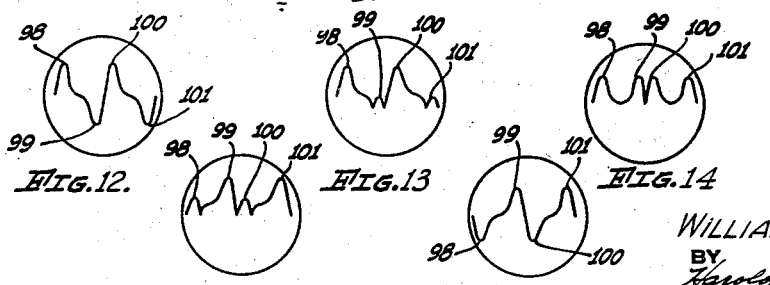
FIG. 12.  FIG. 13.  FIG. 14.
FIG. 15.  FIG. 16.
INVENTOR
WILLIAM J. O'BRIEN,
BY
ATTORNEY.

Patented Mar. 30, 1948

2,438,573

UNITED STATES PATENT OFFICE 2,438,573

EQUISIGNAL RADIO BEACON SYSTEM

William J. O'Brien, London, England, assignor to The Decca Record Company, Limited, London, England, a corporation of Great Britain Original application March 2, 1942, Serial No. 432,948. Divided and this application November 5, 1943, Serial No. 509,024. In Great Britain March 1, 1943

8 Claims. (Cl. 343—107)

1

My invention relates to a radio beacon system and has particular reference to an equi-signal type of radio beacon which finds particular utility when employed as a navigation aid for vehicles and conveyances, particularly aircraft.

This is a division of my copending application Serial No. 432,948, filed March 2, 1942 now Patent No. 2,406,396 issued August 27, 1946 and entitled "Equisignal radio beacon system."

The equi-signal type of radio beacon system is that which is at present employed in the United States Department of Commerce airways radiorange beacon for establishing the transcontinental air routes followed by the commmercial air transport companies. This type of system generally comprises a group of radio transmission antennae so arranged and so operated that the course along which it is desired to navigate an aircraft comprises the locus of points of equal signal intensities as regard separate signals of like frequency emanated from the antennae. In general, these separate signals are reciprocally and distinguishably keyed "off" and "on," the conventional arrangement being that in which one signal is keyed with the International Morse Code character for A (. _) while the other is alternately keyed N (_ .). If the aircraft is "on course" the intensities of the two signals are equal and the off periods of one coincide with the on periods of the other so that a steady and continuous signal is received. If the plane is "off course," one of the signals will predominate over the other and the keying of the signals will be apparent. The direction in which the plane has drifted from the course is indicated by whether the A or N signal predominates.

The present systems while of great assitance in the navigation of aircraft, nevertheless are characterized by certain disadvantages and difficulties. For example, the present systems do not provide a sufficiently sensitive indication to permit their successful application to long range control, as for example, the guiding of bombing planes in war time to an objective to be bombed situated five or six hundred miles distant. The sensitivity of the present system can be increased by increasing the antenna spacing. There are, however, practical limitations on how far apart the antennae may be successfully spaced and, furthermore, an increase in antenna spacing likewise increases the number of equi-signal courses produced so that the danger of an aircraft becoming lost through inability to identify the course is correspondingly increased.

It is, therefore, an object of my invention to

2 provide an equi-signal type of radio beacon system which overcomes the above noted disadvantages by providing for increased sensitivity of indication.

It is a still further object of my invention to provide a radio beacon system of the character set forth hereinbefore which also includes a novel signal modulating arrangement which avoids the necessity of keying the beacon transmitters.

It is also an object of my invention to provide a radio beacon system of the character set forth in the preceding paragraph which includes an improved type of visual indicator for apprising the pilot of a vehicle or conveyance of his location with respect to the course intended to be followed.

Other objects and advantages of my invention will be apparent from a study of the following specifications, read in connection with the accompanying drawings, wherein:

Fig. 1 is a diagrammatic view illustrating by means of curves drawn on rectangular coordinates the relative signal intensities produced by two continuously operated radio transmission antennae with a periodically reversed signal introduced from a central antenna;

Fig. 2 is a diagrammatic view illustrating the mode of operation of the three antennae to produce the field patterns illustrated in Fig. 1, and illustrating also the manner in which that mode of operation serves to provide an indication of the location of a vehicle with respect to the course intended to be followed;

Fig. 3 is a wiring diagram illustrating diagrammatically a novel form of transmitting equipment for defining equi-signal courses and for producing a somewhat different type of indication as to the location of a vehicle with respect to one of the equi-signal courses;

Fig. 4 is a rectangular diagram illustrating the wave form of the modulating voltage applied to the signals emanated by the central antenna of the system illustrated in Fig. 3 and illustrating also the sine wave components which produce that particular form of modulating voltage;

Fig. 5 is a rectangular diagram illustrating the modulated radio signal which is emanated from the central antenna;

Fig. 6 is a diagram illustrating the radio frequency signal which is emanated by the two spaced antennae of the system;

Fig. 7 is a diagram illustrating the result of combining the radio frequency voltages illustrated, respectively, by Figs. 5 and 6 and rectify-ing this result;

Fig. 8 is a view similar to Fig. 7 but illustrating the rectified wave form resulting from the condition in which the amplitude of the radio frequency illustrated by Fig. 6 is equal to the maximum amplitude of the radio frequency signal illustrated by Fig. 5;

Fig. 9 is a diagram illustrating the change in wave form resulting from shifting one of the sine wave components illustrated in Fig. 4 relative to the other;

Fig. 10 is a schematic wiring diagram illustrating the receiving apparatus for receiving the signals produced by the system illustrated in Fig. 3 and including a cathode ray tube as the visual indicating instrument by means of which the pilot of an aircraft is apprised of the location of the craft with respect to the selected course;

Fig. 11 is a schematic wiring diagram illustrating a somewhat different form of receiving apparatus in which a galvanometer is employed as the visual indicating instrument;

Fig. 12 is a diagrammatic representation of the fluorescent screen of the cathode ray tube and illustrating the form of the pattern produced thereon by the electron stream when the receiving apparatus is situated far to the left of the intended course;

Fig. 13 is a view similar to Fig. 12 but illustrating the pattern produced when the craft is moved nearer to the intended course;

Fig. 14 is a view similar to Fig. 12 but representing the "on course" indication produced by the receiving apparatus;

Fig. 15 is also a view similar to Fig. 12 but illustrating the character of indication provided when the vehicle is moved somewhat to the right of the intended course; and Fig. 16 is a view similar to 12 and illustrating the indication produced when the vehicle is far to the right of the course intended to be followed.

Referring to the drawings, I have illustrated in Fig. 1, by means of the dashed line A, B, the field pattern produced by a continuous operation of two antennae spaced two wavelengths apart with the energy radiated from these antennae in phase opposition to each other. The solid line in Fig. 1 illustrates the field strength pattern resulting from introducing radiation from a centrally positioned antenna C, which radiation is so phased as to lead the radiation from antenna A by 90 electrical degrees. Similarly, the dotted line curve in Fig. 1 illustrates the field pattern resulting from so operating antenna C as to cause the signals to lag the A signals by 90°.

It will be noted that if the solid line and dotted line patterns are produced alternately as by periodically reversing the phase of antenna C, there are defined at the intersection of the solid and dotted lines eight equi-signal courses which are characterized by high sensitivity and accuracy. It will be further noted that since the solid and dotted curves parallel each other, the difference in signal intensity resulting from a movement of the vehicle to one side of the selected course will be limited to a reasonable maximum.

Fig. 2 is intended to illustrate the mode of operation of the antennae to produce this type of field strength pattern and illustrates also the manner in which the signals provide an indication to the pilot of the vehicle as to his location with respect to a selected course. By referring to the upper portion of Fig. 2, it will be noted that antennae A and B are operated continuously, whereas antenna C is so operated as to have its phase periodically reversed. This periodic operation of antenna C is so arranged that the periods of operation in one phase are substantially three times as long as the periods of operation in the other phase.

Along the equi-signal course the signals resulting from each of the two types of operation of antenna C will be equal so that the signal heard by the pilot of the vehicle will be such as that represented by the straight line 25 in Fig. 2. If, on the other hand, the vehicle wanders to one side of the selected course, the signals resulting from operating antenna C in such fashion as to lead the signals emanated from antenna A will predominate over those resulting from the opposite operation of antenna C. This predominance is illustrated in the lower portion of Fig. 2 in that part disposed to the left of the wavy break line 26. This produces a signal which the pilot of the vehicle hears and interprets as comprising a series of spaced dot signals.

When the vehicle wanders to the opposite side of the course, the conditions just described are reversed so that the signals of longer duration predominate over the signals of short duration as is illustrated by that part of Fig. 2 lying to the right of the wavy break line 27. This produces a signal which the pilot interprets as comprising a series of spaced dash signals.

I have illustrated in Fig. 3 an improved form of radio transmitting apparatus adapted particularly to the production of course-determining signals for an equi-signal beacon system such as that just described.

The apparatus accordingly includes transmitting antennae A, B and C which are geographically positioned as described hereinbefore. Antennae A and B are each coupled through suitable loading devices 30 and impedance matching transformers 31 to a suitable source 32 of radio frequency energy, a suitable transmission line such as a coaxial cable 33 being employed to convey the radio frequency energy from the source 32 to the coupling devices 31.

Antenna C is similarly coupled to a power amplifier 34 which is adapted to be excited by the signals produced by the signal source 32 and modulated by a modulator indicated generally by the reference character 35. The modulator 35 preferably includes an input transformer 36, the primary of which is connected as by means of conductors 37 to receive energy from the signal source 32. The secondary of the transformer 36 is preferably center tapped and grounded through a grid resistor 38, the ends of the secondary winding being respectively connected as by conductors 39 and 40 to the grids of a pair of screen grid modulator tubes 41 and 42.

The secondary of the transformer 36 is preferably tuned to the frequency of the signal source by means of shunt connected condensers 43 and 44 and the requisite grid bias for the tubes 41 and 42 may be obtained by connecting the cathodes thereof to ground through a cathode bias resistor 45 shunted by a suitable by-pass condenser 46.

The plates of the tubes 41 and 42 are connected in parallel by means of a conductor 47 through the tuned primary of a coupling transformer 48 to a source of plate potential indicated schematically by the character B+. The coupling transformer 48 is connected to the input of the power amplifier 34 so that signals produced by the source 32 are modulated in a manner to be described hereinafter by the tubes 41 and 42 and are impressed upon the antenna C.

The screen grid elements of each of the tubes 41 and 42 are connected respectively to opposite ends of a modulating secondary winding provided on a modulating transformer 49. This winding is center tapped and connected to a suitable source of positive screen potential indicated schematically by the character S+. The primary of the modulating transformer 49 is connected to a suitable source of modulating signal.

It will be noted that the grids of the tubes 41 and 42 are connected in push-pull relation to each other so that the potentials impressed thereon are of opposite phase. The plates of the tubes 41 and 42 are connected in parallel with the result that whenever the amplification of the tubes is equal, no signal will be impressed across the coupling transformer 48.

An alternating current modulating signal applied to the modulating transformer 49 will operate to shift the screen potentials applied to the screen grid elements of the tubes 41 and 42 simultaneously and in opposite directions so as to oppositely vary the amplification of these tubes. As the amplification of the tubes is shifted from the balanced condition to that, for example, in which the amplification of the tube 41 exceeds that of the tube 42, a signal will appear across the coupling transformer 48, the amplitude of which signal is proportional to the magnitude of the potential shift of the screen grid elements. If the potential applied to the screen grid elements is oppositely shifted a like amount as is the case during the negative half cycle of an alternating current modulating signal, an equal signal will be produced across the coupling transformer 48. This signal will, however, have a phase relation opposite to that of the signal produced in the previously described condition.

The modulator 35, therefore, operates to vary the amplitudes of the signals produced by the antenna C so as to produce a radio frequency signal envelope having the same shape as the wave form of the modulating signal impressed on the modulating transformer 49. In addition to this conventional modulating feature, however, the modulator 35 serves to actually reverse the phase of the radio frequency signals produced each half cycle of the modulating signal.

With the foregoing general considerations in mind, reference is had to Fig. 4 which illustrates the preferred type of modulating signal applied to the transformer 49. This signal is a complex wave formed by adding a fundamental sine wave signal represented by the dash-dot line 50 in Fig. 4 to a second harmonic signal of half the amplitude of the fundamental signal as is represented by the dotted line 51 in Fig. 4. When the phase of the fundamental and the second harmonic are adjusted with respect to each other as is illustrated in Fig. 4 wherein the fundamental 50 is illustrated as bearing the multiple phase quadrature relation to the second harmonic signal 51, the resulting signal produced by the addition of this fundamental and second harmonic comprises a complex wave form such as that illustrated by the solid line 52 in Fig. 4. The complex wave form illustrated by the solid line 52 in Fig. 4 is the modulating signal which I prefer to supply to the modulating transformer 49.

The signal emanated from antenna C resulting from this modulation of the radio frequency signal is illustrated in Fig. 5 wherein the dotted line 53 is intended to illustrate the radio frequency signal and the solid lines 54 are intended to illustrate the envelope defined by the varying amplitude of the radio frequency signals 53. The frequency indicated in Fig. 5 by the wavelength of the radio frequency signals has been greatly reduced for the purpose of clarifying the drawing and the description. It will be realized that in practice the radio frequency signal has a frequency so high with respect to the modulation frequency that it would be impossible to accurately represent the frequency difference in a figure such as Fig. 5.

Recalling now the preceding description of the radio beacon system of my invention, it will be observed that antennae A and B are continuously operated in phase opposition to each other so that the equi-signal course defined by the two field patterns resulting from the introduction of a periodically reversing radiation from antenna C lines along a line of zero signal as regards the vector sum of the A and B signals.

Whenever the vehicle wanders from the equi-signal course, the vector sum of the A and B signals becomes a finite value and this condition is illustrated in Fig. 6 wherein the sine wave 55 represents the resultant of the two radio frequency signals resulting from the operation of antennae A and B at a location somewhat to one side of the equi-signal course which is defined by the system. The signal which is received by the receiving apparatus mounted on the vehicle is, of course, the vector sum of the A, B and C signals.

It will be noted by comparing Figs. 5 and 6 that during that portion of the transmission of a given cycle lying between the points marked on Fig. 5 with the reference characters 56 and 57, the A and B signals represented by Fig. 6 are in phase opposition to the C signal represented by the dotted line 53 in Fig. 5. During that portion of the cycle lying between the point 57 and the point marked 58, the A, B signals are in phase with the C signal. This periodic reversal of the phase relationships occurs each half cycle where reference is made to the frequency of the modulating signal. The result of detecting as by rectification of the combined A, B and C signals is illustrated by the solid line curve 59 in Fig. 7.

If the vehicle wanders farther from the equi-signal course than is represented by Fig. 6, the amplitude of the A, B signal increases correspondingly. Fig. 8 illustrates by the solid line curve 60 the rectified signal produced when the vehicle has wandered from the course sufficiently far for the amplitude of the A, B signal to be equal to the maximum amplitude of the C signal. It will be obvious, of course, that when the vehicle is "on course," no A, B signal is received because the amplitude of that signal is zero and the C signal is the only one which is received. Detection of the C signal will produce a curve corresponding exactly to that portion of the envelope curve 54 which is disposed above the longitudinal axis represented by the line 61 in Fig. 5. If, on the other hand, the vehicle were to wander to the opposite side of the equi-signal course, the phase of the A, B signal would be precisely opposite to that illustrated in Fig. 6 with the result that the "off course" detected signals produced would be such as are indicated by the dotted lines 62 and 63 in Figs. 7 and 8, respectively.

I propose to employ the widely differing wave form of the detected signals as a means for indicating visually to the pilot of the vehicle his position with respect to the equi-signal course. I have illustrated in Fig. 10 one form of receiving and indicating equipment which is particularly adapted to providing this form of indication.

This receiving apparatus may include a substantially conventional radio frequency receiver or amplifier 64 equipped with suitable signal pickup facilities such as an antenna connection 65 and a ground connection 66. The radio frequency output of the receiver is preferably coupled as by means of a conductor 67 to the plate of a diode or rectifier tube 68. The cathode of the rectifier tube 68 is preferably grounded as at 69 and connected through a cathode resistance 70 to the other output terminal of the receiver 64 as by a conductor 71. The resistance 70 is preferably by-passed with a shunt connected by-pass condenser 72.

The rectifier 68 operates to produce across the resistance 70 a direct potential whose magnitude varies in accordance with the shape of the modulation envelope of the radio frequency signals received by the receiver 64. The potential of the conductor 71 with respect to ground, therefore, conforms to the wave shapes illustrated in Figs. 7 and 8 previously described and also to the upper half of the modulation envelope 54 which is illustrated in Fig. 5.

This varying voltage is coupled by conventional resistance coupling including a coupling condenser 73 and a grid resistance 74 to the input of an amplifier tube 75. The output of this tube is coupled by means of a plate resistance 76 and a coupling condenser 77 to a switch terminal 78 which is adapted to be contacted by a movable switch armature 79 which is in turn connected to the input of an amplifier tube 80. The grid circuit of the amplifier tube 80 preferably includes also a grid resistance 81.

The grid bias for the tubes 75 and 80 may be provided as by means of grid bias batteries 82 and 83 connected between the lower ends of the resistances 74 and 81 and ground.

The output of the second amplifier tube 80 is coupled through a resistance coupling unit including a coupling condenser 84, a plate resistance 85 and an output resistance 86 across the vertical deflection plates 87 of a cathode ray oscillograph tube 88.

By this means the fluorescent spot produced upon the screen of the cathode ray tube by the normal operation of this tube is caused to move vertically back and forth across the screen of the tube in accordance with the amplitude variations of the detected signal as represented by Figs. 5, 7 and 8 previously described. The cathode ray tube is preferably so operated as to simultaneously and repeatedly move the cathode spot from left to right across the cathode ray tube screen so as to cause the combined movements of the spot to trace upon the screen of the tube a pattern corresponding exactly to the wave form of the detected signal.

This may be accomplished by applying across the horizontal deflection plates 89 of the cathode ray tube 88 a control voltage having a saw-tooth wave form; that is, the voltage is caused to build up at a constant rate from a minimum value to a predetermined maximum value and then fall almost instantly to the predetermined minimum value. This type of control voltage is generated by a saw-tooth oscillator employing a grid controlled gas discharge tube 90. A condenser 91 is connected across the plate and cathode of the tube 90 and the plate of the tube 90 is connected to a suitable source of direct potential such as is indicated by the legend B+ through a conductor 92 in which is included a fixed resistance 93 having a relatively high ohmic value. The voltage which appears between the plate of the tube 90 and ground is preferably applied across the deflection plates 89 as by grounding one of these plates and connecting the other to the plate of the tube 90 through a coupling condenser 94. The ungrounded deflection plate 89 is preferably grounded through a leak resistance 95.

In operation, direct current flows from the source B+ through the resistance 93 and into the condenser 91 so as to charge up the condenser 91. The time required for charging the condenser 91 to a predetermined voltage is determined by the capacity of the condenser 91 and the resistance of the series resistor 93. As the voltage across the condenser 91 builds up, the cathode ray spot on the fluorescent screen of the cathode ray tube 88 is caused to progress across the screen at a uniform rate until the voltage across the condenser 91 builds up to a value sufficient to ionize the gas in the grid controlled gas discharge tube 90. When this condition obtains, a low resistance conductive path is formed between the plate and cathode of the tube 90, serving to completely discharge the condenser 91 almost instantly. The resulting fall in voltage between the plate and cathode of the tube 90 interrupts the discharge within the tube and allows the voltage across the condenser 91 to again start the slow building up process.

I prefer to select values of capacity and resistance for condenser 91 and resistor 93 which will make the time of this condenser discharge cycle equal to two cycles of the signal which is applied to the vertical deflection plates 87. The sweep frequency generated by the tube 90 may be synchronized with the signal which is applied to the vertical deflection plates 87 by connecting the grid of the tube 90 to the ungrounded deflection plate 87 through a coupling condenser 96 and a coupling resistor 97.

The system just described operates, therefore, to produce on the cathode ray tube screen a continuous trace faithfully reproducing the wave form of the detected signal which is picked up by the receiver. The form and configuration of this trace may be used to readily indicate to the pilot of a vehicle his position with respect to the equi-signal course.

Fig. 14 represents the appearance of the cathode ray tube screen when the vehicle is "on course." It will be noted that this trace is characterized by four positive peaks indicated in Fig. 14 by reference characters 98, 99, 100 and 101. A comparison of Fig. 14 with Fig. 5 will indicate that the trace of Fig. 14 is an accurate representation of the positive half of the modulation envelope produced by detecting the signals received when the aircraft is "on course."

If the aircraft wanders to the left of the course, the trace on the cathode ray tube screen will change to a form such as that illustrated in Fig. 13, this trace being the equivalent of the rectified signal illustrated in Fig. 7. Attention is directed to the fact that the peaks 99 and 100 are closely adjacent and that the "on course" condition is indicated by the equality of value of these peaks. Since the peaks 99 and 100 are closely adjacent and since the "on course" indication illustrated in Fig. 14 is symmetrical about a vertical center line, it becomes extremely easy to detect slight deviations from the course by the destruction of the vertical symmetry of the figure and the resulting difference in heights of the peaks 99 and 100.

Fig. 12 illustrates the trace resulting from the drifting of the vehicle still farther to the left of the course, while Fig. 15 and Fig. 16 illustrate successive deviations of the vehicle to the right of the equi-signal course.

It will be noted that when the vehicle has moved to the left of the course, the left-hand one of the two peaks 99 and 100 is lowered, or conversely stated, that the right-hand one of the two peaks is the taller. When the vehicle wanders to the right of the course, the converse situation obtains and the left-hand one of the two peaks 99 and 100 is the taller. Thus the direction of deviation of the vehicle from the selected course is also indicated, the taller of the two peaks indicating the direction of corrective travel in order to reach the desired course.

In the system just described it is highly desirable that the outside antennae A and B be so operated as to provide a signal intensity which is considerably in excess of the signal intensity produced by the central antenna C. The greater the difference between the intensities of these signals, the greater is the sensitivity of indication afforded by the traces formed on the cathode ray tube screen. For example, if antennae A and B are so operated that each of them produces a field intensity at the location of the vehicle of fifty microvolts per meter, the intensity of the A, B signals will vary from zero when the vehicle is "on course" to one hundred microvolts per meter as a maximum. If the antennae A and B are spaced two wavelengths, this maximum will be realized when the vehicle has wandered 15° from the course. When the vehicle is but 1° "off course," the field strength of the A, B signals will be ten microvolts per meter.

If at this time the maximum instantaneous field strength of the modulated signal received from antenna C is ten microvolts per meter, the trace produced on the cathode ray tube screen will be that illustrated by Fig. 12 or Fig. 16 so that the change in visible indication produced by the vehicle in wandering from an "on course" location to a location 1° off of the desired course will produce a change in the indicated pattern such as that represented in the change from Fig. 14 to Fig. 12.

If, on the other hand, the field strength produced by the central antenna C were thirty microvolts per meter instead of the ten assumed in the preceding example, the change produced by the movement of the vehicle from the course to a location 1° from the course would be such as that illustrated by the change from Fig. 14 to Fig. 13. Obviously the sensitivity of indication is less in this second example.

From the above examples an idea of the sensitivity of the indicating system of my invention may be obtained. If the change from Fig. 14 to Fig. 12 represents only a 1° deviation from the selected course, it will be apparent that a discernible difference in the height of the two peaks 99 and 100 will be produced by an almost negligible deviation of the vehicle from the indicated course.

If the vehicle is operating at a great distance from the beacon transmitting stations, the noise level produced by static and other extraneous disturbances may be sufficiently high to make it difficult to ascertain the relative heights of the peaks 99 and 100.

In this case the switch arm 79 illustrated in Fig. 10 is thrown to its second position. This arm is also connected mechanically to a second switch 102 so arranged as to be closed when the switch arm 79 is thrown to the aforesaid other position. The switch 102 is included in a circuit coupling a suitable radio frequency oscillator 103 to the primary winding of a coupling transformer 104. The secondary of this transformer is connected in series in the cathode circuit of the rectifier tube 68. The radio frequency output of the receiver 64 is thus mixed with the radio frequency output of the oscillator 103. The frequency of the oscillator 103 is so adjusted that the difference in frequency between these two radio frequencies is preferably of an audible frequency.

This audible frequency appears as an alternating voltage across the cathode resistance 70 and is modulated by the modulation envelope of the received signal. This modulated beat frequency is preferably applied to the grid of an amplifier tube 105 through a suitable condenser and resistance coupling 106. The output of the tube 105 is connected to a coupling transformer 107 whose primary and secondary windings are sharply tuned to the beat frequency which is amplified by the tube 105. The tuned secondary of the transformer 107 is connected with a switch point 108 which is contacted by the switch arm 79 when it is thrown to its alternative position. The modulated audible frequency is thus applied to the amplifier tube 80 and to the vertical deflection plates of the cathode ray tube 88 so that there is produced on the screen of the cathode ray tube a trace similar to those illustrated in Figs. 12 through 16 but comprising actually the trace of the modulated audible frequency which is impressed on the vertical deflection plates. The sharply tuned transformer 107 operates to exclude a high percentage of the noise, static, and extraneous signals which are picked up by the receiver 64 and this latter system thus serves to materially extend the useful range of the indicating system.

In case the noise level is so high that the arrangement just suggested fails to produce understandable indications on the cathode ray tube screen, recourse may be had to energizing the central antenna C intermittently. During the periods of non-operation of the central antenna, the trace produced on the cathode ray tube screen will be such as that illustrated by Fig. 6, the amplitude of this trace being zero when the vehicle is "on course." Whenever the trace on the cathode ray tube screen changes during the periods of non-operation of the antenna C from a straight horizontal line to a trace such as that illustrated by Fig. 6, the pilot of the vehicle is apprised of the fact that he has wandered from the desired course. During periods of operation of the central antenna, the trace on the cathode ray tube screen will be such as that illustrated in Fig. 12 or Fig. 13 and a determination of which of the peaks 99 or 100 is the taller will apprise the pilot of the direction in which he must pilot the vehicle in order to come back to the desired course.

In Fig. 11 I have illustrated an alternative form of receiving and indicating equipment which may be used with the beacon system described in connection with Figs. 3 through 8. In this form of the invention a suitable radio frequency receiver or amplifier 109 is coupled to an antenna 110 and ground connection 111 to receive and amplify the signals emanated from antennae A, B and C, the output of the amplifier 109 being applied across a diode or rectifier tube 112 in the cathode circuit of which is placed a cathode resistance 113 by-passed by a suitable by-pass condenser 114.

The detected signal corresponding to the modulation envelope thus appears across the resistor 113, the ungrounded terminal of which is connected through a condenser 115 to the grids of a pair of amplifying tubes 116 and 117, these grids being connected in parallel and grounded through a grid resistance and a grid bias cell or battery in the conventional manner.

The outputs of the tubes 116 and 117 are fed, respectively, to tuned coupling transformers 118 and 119. The secondaries of these two transformers are also tuned and are connected in series as by means of a conductor 120. One free end of the series connected secondaries is grounded as at 121 and the other is connected as by means of a conductor 122 to the grid of an amplifying tube 123. Suitable operating bias for the amplifier tube 123 may be obtained by means of a cathode bias resistance 124 suitably by-passed as by means of condenser 125.

The transformer 118 is tuned to the second harmonic component of the modulating frequency while the transformer 119 is tuned to the fundamental component of the modulating frequency. One or both of the transformers is, however, slightly detuned so as to produce a shift in the phase of the signal passed through one transformer different from the phase shift produced on the signal passed through the other transformer. This difference in phase shift is so adjusted as to change the relationship between the fundamental and the harmonic illustrated in Fig. 4 to that which is illustrated in Fig. 9, wherein the dotted line 51a represents the second harmonic component of the signal and the dot-dash line 50a represents the fundamental component of the signal.

Fig. 9 illustrates the phase relation of the signals at the output terminals of the transformers 118 and 119 so that the recombining of these signals by the series connection of the secondaries of the transformers 118 and 119 produces a wave form such as that illustrated by the solid line 52a in Fig. 9.

It will be noted that this wave form is characterized by having a positive peak of relatively low amplitude and long duration and a negative peak of relatively high amplitude and short duration. This is the condition which obtains when the vehicle is to one side of the selected course. When the vehicle is on the opposite side of the selected course, the phase of the high frequency component is reversed with respect to the phase of the low frequency component so that the resulting signal applied to the grid of the tube 123 is the reciprocal to that which is illustrated in Fig. 9 and is characterized by having a relatively high positive peak of short duration and a relatively low negative peak of long duration.

The output of the tube 123 is applied across the primary of a transformer 126, the secondary of which is preferably tapped at the center and grounded as by a conductor 127. The free ends of the secondary winding of the transformer 126 are connected, respectively, to the grids of a pair of amplifier tubes 128 and 129. The plates of these tubes are each connected to a suitable source of plate potential represented by the legend B+ through plate resistances 130 and 131, which resistances are, respectively, shunted by high capacity condensers 132 and 133. The plates of the tubes 128 and 129 are, furthermore, interconnected directly through a low resistance galvanometer 134 which is preferably provided with a center zero scale. Each of the tubes 128 and 129 is biased to practically cut off as by connecting the cathodes thereof through a common cathode bias resistor 135. When so biased, neither of the tubes 128 or 129 will draw an appreciable plate current until a positive potential is applied to the grids thereof.

When the vehicle is "off course" in such direction that the signal applied to the primary of the transformer 126 is such as that illustrated by the solid line 52a in Fig. 9, a voltage having this precise wave form will be applied to the grid of the tube 128 and an exactly similar voltage but of opposite phase will be applied to the grid of the tube 129. Thus during the long duration positive half cycle of the received signal, the tube 128 will draw plate current, while during the short duration negative half cycle the tube 129 will draw current. A voltage drop will be produced across the resistances 130 and 131 which is proportional to the magnitudes of the currents drawn by the tubes, and the condensers 132 and 133 will be similarly charged.

The high capacity of these condensers and the relatively high ohmic value which is preferred for the resistors 130 and 131 serve to maintain the condensers 132 and 133 substantially charged during the half cycle in which the associated tube is not drawing any plate current. Since the magnitude of the negative half cycle is considerably in excess of the value of the positive peak, the plate current drawn by the tube 129 will exceed that which is drawn by the tube 128. Thus the voltage which is produced across the resistance 131 will exceed the voltage which is produced across the resistance 130. Since these voltages are opposed to each other the meter 134 will measure the difference in voltage and the direction of deflection of the meter 134 will indicate the polarity of this difference in voltage.

If the vehicle wanders to the opposite side of the selected course, the conditions with respect to the tubes 128 and 129 will be just reversed from that above described because of the reversal of phase of the signal which is applied to the grids of each of these tubes. Thus the voltage across the resistance 130 will exceed that across the resistance 131 and the needle of the galvanometer 134 will be deflected in the opposite direction. Thus the direction of deflection of the meter 134 will serve to indicate the location of the vehicle with respect to the selected course.

When the vehicle is "on course," the wave form which is applied to the grids of the tubes 116 and 117 will be such as to have no low frequency component to be passed through the transformer 119 so that there will be no difference in the magnitude of the positive and negative peaks of the signal applied to the tubes 128 and 129 with the result that the voltages across the resistances 130 and 131 will be equal and no deflection of the meter 134 will be produced. The center position of the meter 134 thus indicates the fact that the vehicle is on the selected course.

The system above described provides a distinct advantage over the conventional methods of operating radio range beacon transmitters wherein one or all of the transmitters are keyed "off" and "on" in that the equipment and apparatus required to modulate the signal emanated from the central antenna is much simpler and less likely to get out of order than is a mechanical switching arrangement such as is required for operating the transmitting equipment intermittently.

Furthermore, the relatively simple wave form of the modulated signal and its relatively low frequency serve to limit the side bands of the transmitted signal within narrow limits, thus permitting a number of beacon systems of this type to be operated on closely adjacent frequency channels. The mechanical keying system tends to produce square-topped waves which, as is well known, comprise an infinite series of harmonics with the result that the transmitted side bands have great width as measured in terms of frequency.

It will also be observed that I have provided a unique and novel means for visually indicating to the pilot of a vehicle his location with respect to a desired course and that the form of indication is such as to permit a pilot to readily detect deviations from the course which are so small as to be almost negligible.

While I have shown and described the preferred embodiment of my invention, I do not desire to be limited to any of the details of construction shown or described herein, except as defined in the appended claims.

I claim:

1. The method of producing a radio frequency equi-signal surface for guiding mobile vehicles which consists in simultaneously radiating radio frequency signals of like frequency from three aligned points spaced from each other, and modulating the signal radiated from the center one of said three points with a relatively low audible frequency wave comprising a sine wave fundamental and a lower amplitude sine wave second harmonic.

2. The method of producing a radio frequency equi-signal surface for guiding mobile vehicles which consists in simultaneously radiating radio frequency signals of like frequency from three aligned points spaced from each other, modulating the signal radiated from the center one of said three points with a relatively low audible frequency wave, and reversing the phase of said modulated signal every half cycle of said audible frequency wave.

3. The method of producing a radio frequency equi-signal surface for guiding mobile vehicles which consists in simultaneously radiating radio frequency signals of like frequency from three aligned points spaced from each other, modulating the signal radiated from the center one of said three points with a relatively low audible frequency wave of complex form characterized by a non-uniform time spacing between equal intensity peaks, and reversing the phase of said modulated signal every half cycle of said audible frequency wave.

4. The method of producing and using a radio frequency equi-signal surface for guiding a mobile vehicle along said surface which consists in simultaneously radiating radio frequency signals of like frequency from three aligned points spaced from each other, modulating the signal radiated from the center one of said three points with a relatively low audible frequency wave, reversing the phase of said modulated signal every half cycle of said audible frequency wave, simultaneously receiving and rectifying the signals radiated from said three points, and observing the relative amplitudes of adjacently disposed peaks of said audible frequency wave.

5. A radio beacon system for guiding a mobile vehicle along a selected course comprising a transmitting mechanism including a pair of spaced antennae, means for radiating from said antennae radio frequency course-defining signals of a given frequency and bearing such phase relation to each other as to extend a plane of minimum signal intensity in the direction of said selected course, a central antenna positioned midway between said pair of antennae, means for radiating from said central antenna radio frequency indicating signals having said given frequency and normally bearing along said course substantially a phase quadrature relation to said course-defining signals, means for modulating said indicating signals at a relatively low audible frequency, and means for reversing the phase of said indicating signals every half cycle of said audible frequency; and receiving and indicating means on said vehicle including means for simultaneously receiving said course-defining signals and said indicating signals, means for rectifying said signals, and a cathode ray tube coupled to visually indicate the wave form of said signals after rectification.

6. A radio beacon comprising three antennae spaced from each other, means for radiating simultaneously from said antennae radio frequency signals of like frequency, and means for modulating the signals from one of said antennae with a relatively low audible frequency wave comprising a sine wave fundamental and a lower amplitude sine wave second harmonic.

7. A radio beacon comprising three antennae spaced from each other, means for radiating simultaneously from said antennae radio frequency signals of like frequency, means for modulating the signals from one of said antennae with a relatively low audible frequency wave comprising a sine wave fundamental and a lower amplitude sine wave second harmonic, and means for reversing the phase of said modulated signals every half cycle of said audible frequency wave.

8. A radio beacon comprising three antennae spaced from each other, means for radiating simultaneously from said antennae radio frequency signals of like frequency, means for modulating the signal from one of said antennae with a relatively low audible frequency wave of complex form characterised by a non-uniform time spacing between equal intensity peaks, and means for reversing the phase of said modulated signal every half cycle of said audible frequency wave.

WILLIAM J. O'BRIEN.

REFERENCES CITED

The following references are of record in the file of this patent:

UNITED STATES PATENTS

| Number | Name | Date |
| --- | --- | --- |
| 2,116,667 | Chireix | May 10, 1938 |
| 2,255,569 | Peters | Sept. 9, 1941 |
| 2,314,795 | Luck | Mar. 23, 1943 |
| 2,355,363 | Christaldi | Aug. 8, 1944 |
| 2,403,429 | Anderson | July 9, 1946 |